US006565146B2

(12) United States Patent
Fujan et al.

(10) Patent No.: US 6,565,146 B2
(45) Date of Patent: May 20, 2003

(54) DUMP BODY FOR AN OFF-HIGHWAY RUBBER-TIRED HAULAGE VEHICLE (75) Inventors: Steven J. Fujan, Tulsa, OK (US); William R. Borthick, Glenpool, OK (US)

(73) Assignee: Terex Corporation, Westport, CT (US)

( * ) Notice: Subject to any disclaimer, the term of this patent is extended or adjusted under 35 U.S.C. 154(b) by 0 days.

(21) Appl. No.: 10/152,889

(22) Filed: May 21, 2002

(65) Prior Publication Data
US 2002/0180241 A1 Dec. 5, 2002

Related U.S. Application Data
(60) Provisional application No. 60/294,166, filed on May 29, 2001.

(51) Int. Cl.[7] .............................. B62D 33/02; B60P 1/04
(52) U.S. Cl. ...................... 296/184; 298/17 R; 298/1 R
(58) Field of Search .................... 296/183, 184; 298/1 R, 17 R, 22 R, 7

(56) References Cited

U.S. PATENT DOCUMENTS

| | | | | |
|---|---|---|---|---|
| 1,805,489 A | * | 5/1931 | Kerr et al. ................. 296/184 |
| 1,852,618 A | * | 4/1932 | Le Tourneau ................... 298/5 |
| 1,883,936 A | * | 10/1932 | Kerr ........................... 296/1.1 |
| 1,885,468 A | * | 11/1932 | Nevin .......................... 172/787 |
| 2,140,590 A | * | 12/1938 | Meininger .................... 296/184 |
| 2,465,899 A | | 1/1949 | Maxon, Jr. | |
| 2,490,532 A | * | 12/1949 | Maxon, Jr. ................ 298/22 P |
| 3,331,433 A | * | 7/1967 | Hagberg ...................... 165/51 |
| 3,844,616 A | * | 10/1974 | Acker ........................... 298/10 |
| 4,194,787 A | * | 3/1980 | Williamsen .............. 298/23 M |
| 5,090,773 A | * | 2/1992 | Guillaume ................ 298/17 R |
| 5,322,350 A | * | 6/1994 | Hinson ....................... 298/1 R |
| 5,482,356 A | * | 1/1996 | Goodson, Jr. ........... 298/22 AE |
| 6,193,295 B1 | * | 2/2001 | Stragier ....................... 296/56 |
| 2002/0074848 A1 | | 6/2002 | Azocar | |

FOREIGN PATENT DOCUMENTS

| | | |
|---|---|---|
| DE | 60 494 | 2/1968 |
| DE | 20113706 U1 | 10/2002 |
| WO | WO 02/49879 A2 | 6/2002 |

OTHER PUBLICATIONS

International Search Report in International (PCT) Application No. PCT/US02/16278 dated Sep. 5, 2002.

* cited by examiner

Primary Examiner—D. Glenn Dayoan
Assistant Examiner—Patricia L. Engle
(74) Attorney, Agent, or Firm—Marshall, Gerstein & Borun (57) ABSTRACT A dump body for use on a off-highway rubber-tired haulage vehicle includes a curved floor having a forward portion, a rearward portion, and a pair of side edges extending between the forward portion and the rearward portion. The floor includes a bottom surface adapted for pivotal attachment to the haulage vehicle. A pair of sidewalls are provided that are joined to the floor along a corresponding one of the edges of the floor. Each of the sidewalls includes a forward portion, and each of the sidewalls may be curved. A curved front wall is joined to the forward portion of the floor and to the forward portion of each of the sidewalls. Accordingly, the floor, the sidewalls, and the front wall cooperate to define a payload space.

34 Claims, 9 Drawing Sheets

DUMP BODY FOR AN OFF-HIGHWAY RUBBER-TIRED HAULAGE VEHICLE

RELATED APPLICATIONS

This application claims priority from U.S. Provisional Application Ser. No. 60/294,166, filed May 29, 2001.

FIELD OF THE INVENTION

The present invention relates generally to off-highway rubber tired haulage vehicles, such as dump trucks. More specifically, the present invention relates to a dump body for use on such dump trucks.

BACKGROUND OF THE INVENTION

Figure 1:
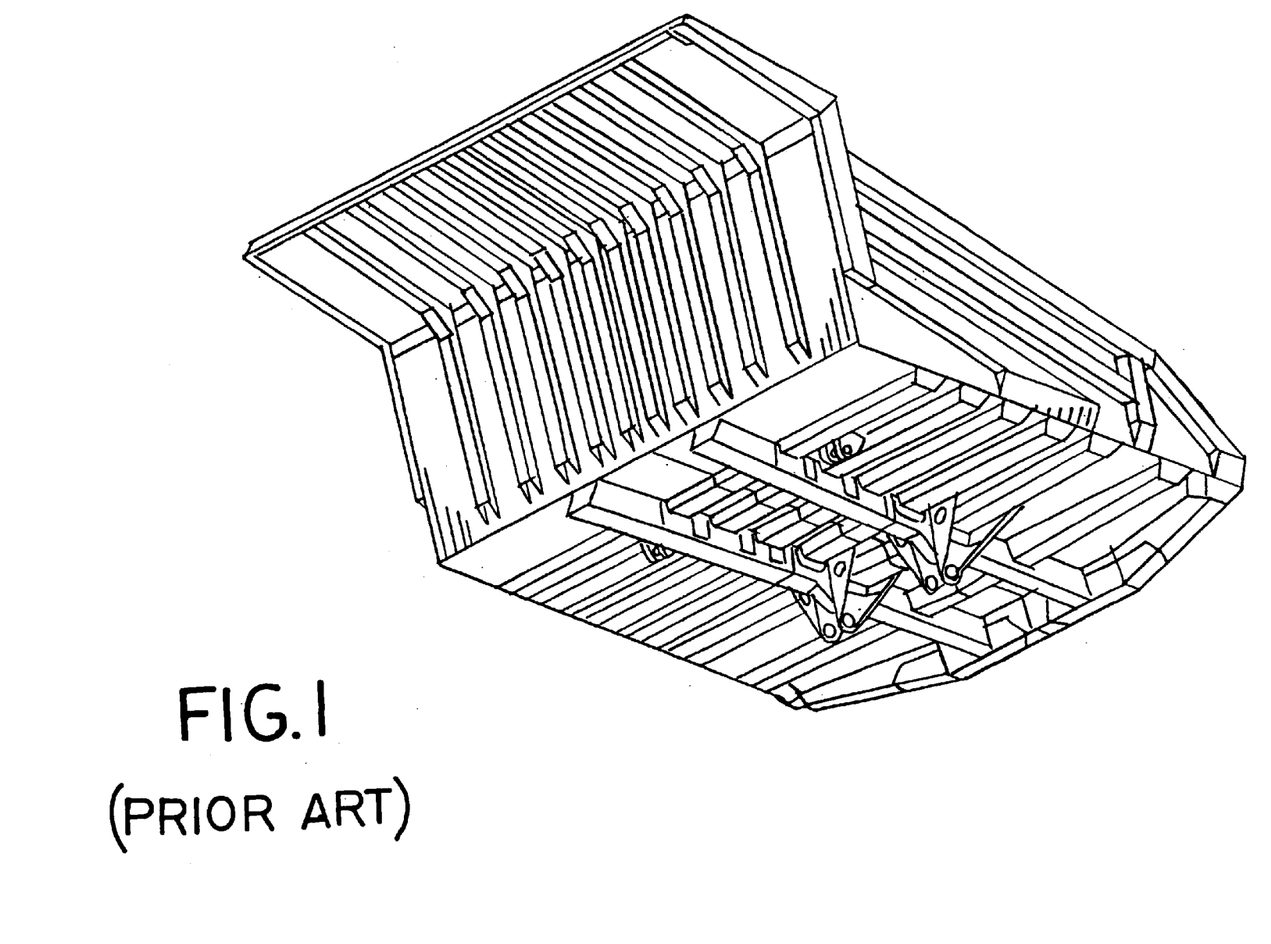
FIG. 1 is a perspective view taken from below of a prior art dump body.

Dump bodies for off-highway rubber tired haulage vehicles are typically constructed from a plurality of flat plates that have been welded together. According to common practice, dump bodies include a flat floor, flat sidewalls, and a flat front wall. Many times a cab protector, which is also flat, is attached to the top edge of the front wall in order to protect the truck cab during loading operations. A typical known prior art dump body is shown in FIG. 1.

It is known that flat plates are generally not well suited for carrying loads perpendicular to their surface. Although flat plates can be stiffened somewhat by increasing the thickness of the plates, in dump body applications merely thickening the plates is not a desirable option, as such an approach increases the weight of the dump body, thus lowering the hauling capacity of the haulage vehicle.

Accordingly, most dump bodies for the aforementioned haulage vehicles are constructed with flat plates which have been stiffened using a system of crisscrossing stiffeners on one or more of the external surfaces such as, for example, one or more of the bottom wall, the sidewalls, the front wall and the cab protector. However, the multitude of stiffeners required again increases the weight of the dump body, and thus exacts the aforementioned haulage capacity penalty. Further, the many interconnecting stiffeners are costly and labor intensive to fabricate and weld in place, and many of the resulting connections may be subject to metal fatigue, thus shortening the effective service life of the dump body.

DETAILED DESCRIPTION OF THE PREFERRED EMBODIMENT

The following description of the disclosed embodiments are not intended to limit the scope of the invention to the precise form or forms detailed herein. Instead, the following description is intended to be illustrative of the principles of the invention so that others may follow its teachings.

Referring now to FIGS. 2–7 of the drawings, a dump body assembled in accordance with the teachings of a first disclosed embodiment of the present invention is generally referred to by the reference numeral 10. It will be understood that the dump body 10, in a preferred environment of use, is for attachment to an off-highway rubber-tired haulage vehicle (not shown) or other suitable vehicles in which the dump body 10 may prove beneficial. However, the teachings of the invention are not limited to off-highway rubber-tired haulage vehicles or to any other particular environment of use. The dump body 10 includes a floor 12, a pair of sidewalls 14, 16, and a front wall 18. The floor 12, the sidewalls, 14, 16, and the front wall 18 cooperate to generally define a payload space 20.

Figure 2:
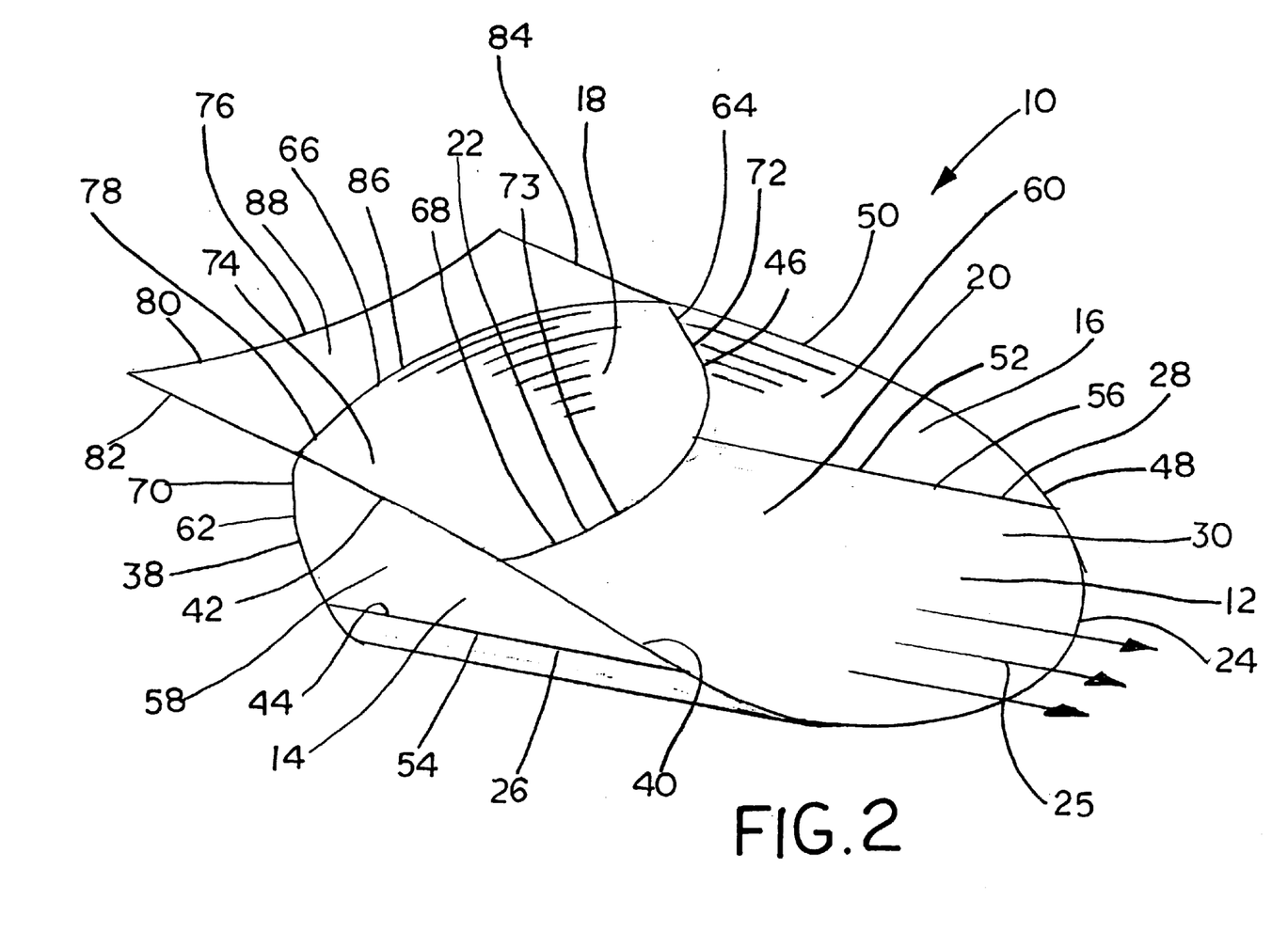
FIG. 2 is a perspective view taken from above of a high efficiency dump body assembled in accordance with the teachings of the present invention.
Figure 3:
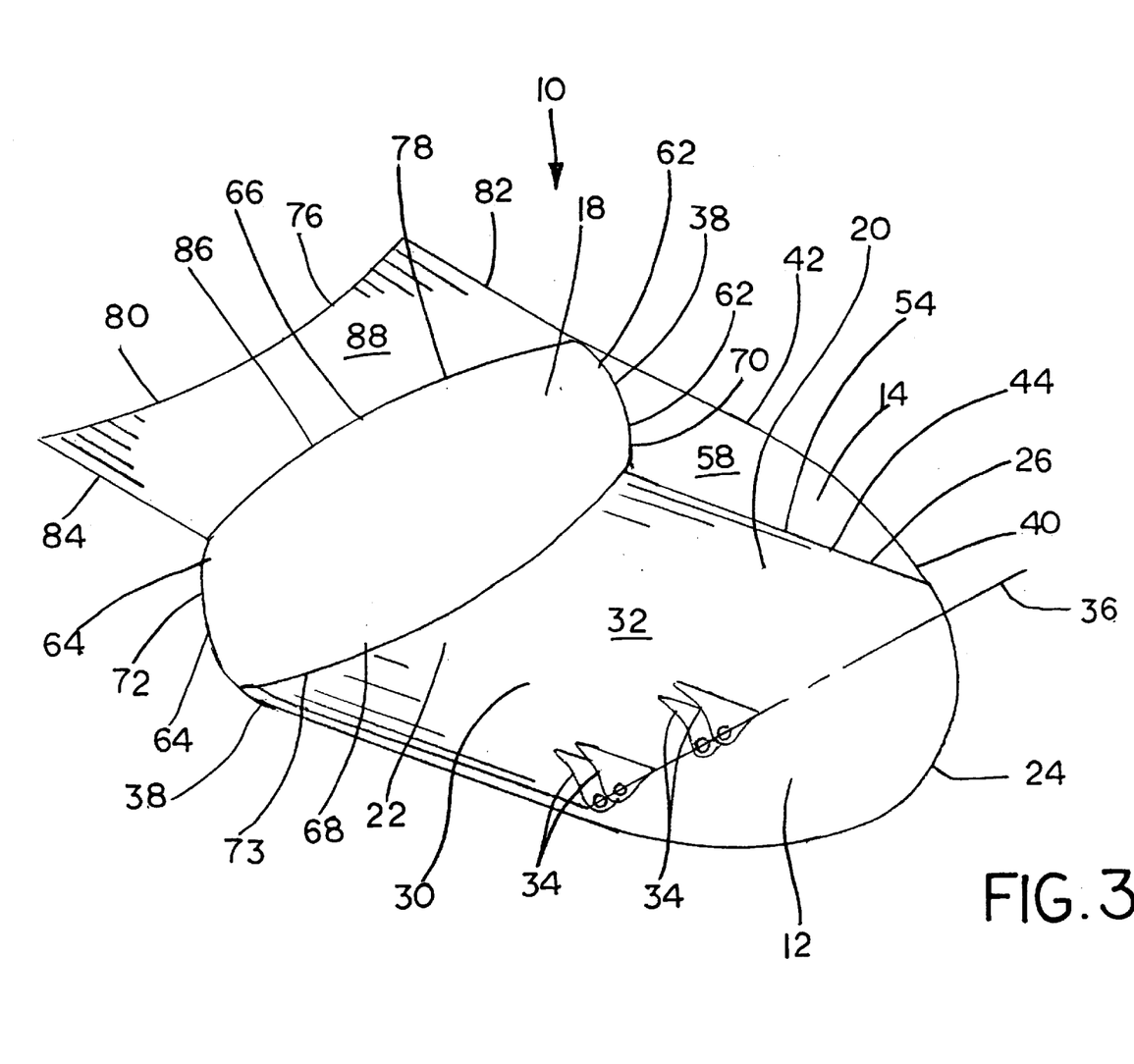
FIG. 3 is a perspective view taken from below of the dump body of FIG. 2.
Figure 4:
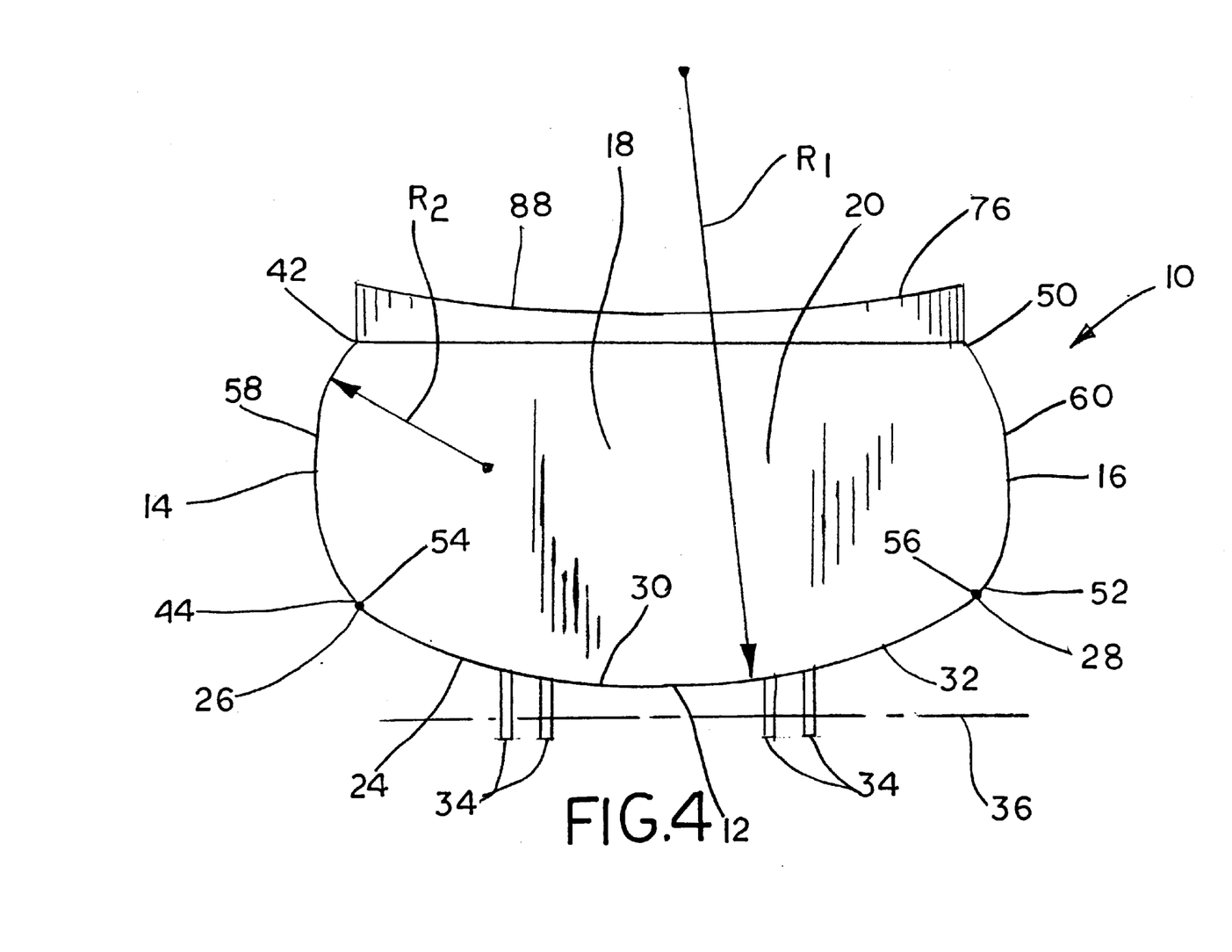
FIG. 4 is a cross-sectional view of the dump body of FIG. 2.

Referring now to FIGS. 2 and 3, the floor 12 includes a forward edge 22 and a rearward edge 24, and a pair of interconnecting side edges 26, 28. The rearward edge 24, which is curved in plan view as shown in FIG. 6 generally defines the rearward extent of a spillway 25. As best shown in FIG. 4, the floor 12 includes a curved section 30 disposed between the side edges 26, 28. In the disclosed embodiment, the curved section 30 extends all the way between the side edges 26, 28 and is shaped to be inwardly concave with respect to the payload space 20. As shown in FIGS. 3 and 4, the floor 12 also includes a bottom surface 32. A plurality of pivot brackets 34 are provided which are secured to the bottom surface 32 of the floor 12. The number, location, and construction of the pivot brackets 34 would be known to those of skill in the art. The pivot brackets 34 are adapted to pivotally engage a portion of the dump truck (not shown) in a known manner, thereby permitting the dump body 10 to pivot about a pivot axis 36 (FIGS. 3, 4 and 5) in a known manner using conventional actuators (not shown).

Referring now to FIGS. 2, 3 and 4, the sidewall 14 of the dump body 12 includes a forward edge 38, a rearward edge 40, and top and bottom edges 42, 44, respectively. The sidewall 16 of the dump body 12 includes a forward edge 46, a rearward edge 48, and top and bottom edges 50, 52, respectively. As shown in FIGS. 2 and 4, the lower edge 44 of the sidewall 14 meets the side edge 26 of the floor 12 along an elongated seam 54. Similarly, the lower edge 52 of the sidewall 16 meets the side edge 28 of the floor 12 along an elongated seam 56. Preferably, seams 54 and 56 are welded. As best shown in FIG. 4, the sidewall 14 includes a curved section 58 disposed between the top and bottom edges 42, 44. Similarly, the sidewall 16 includes a curved section 60 disposed between the top and bottom edges 50, 52. In the disclosed embodiment, the curved sections 58, 60 extend all the way, or substantially all the way, between the top and bottom edges 42, 44 and 50, 52, respectively. The curved sections 58, 60 are shaped to be inwardly concave with respect to the payload space 20.

Figure 5:
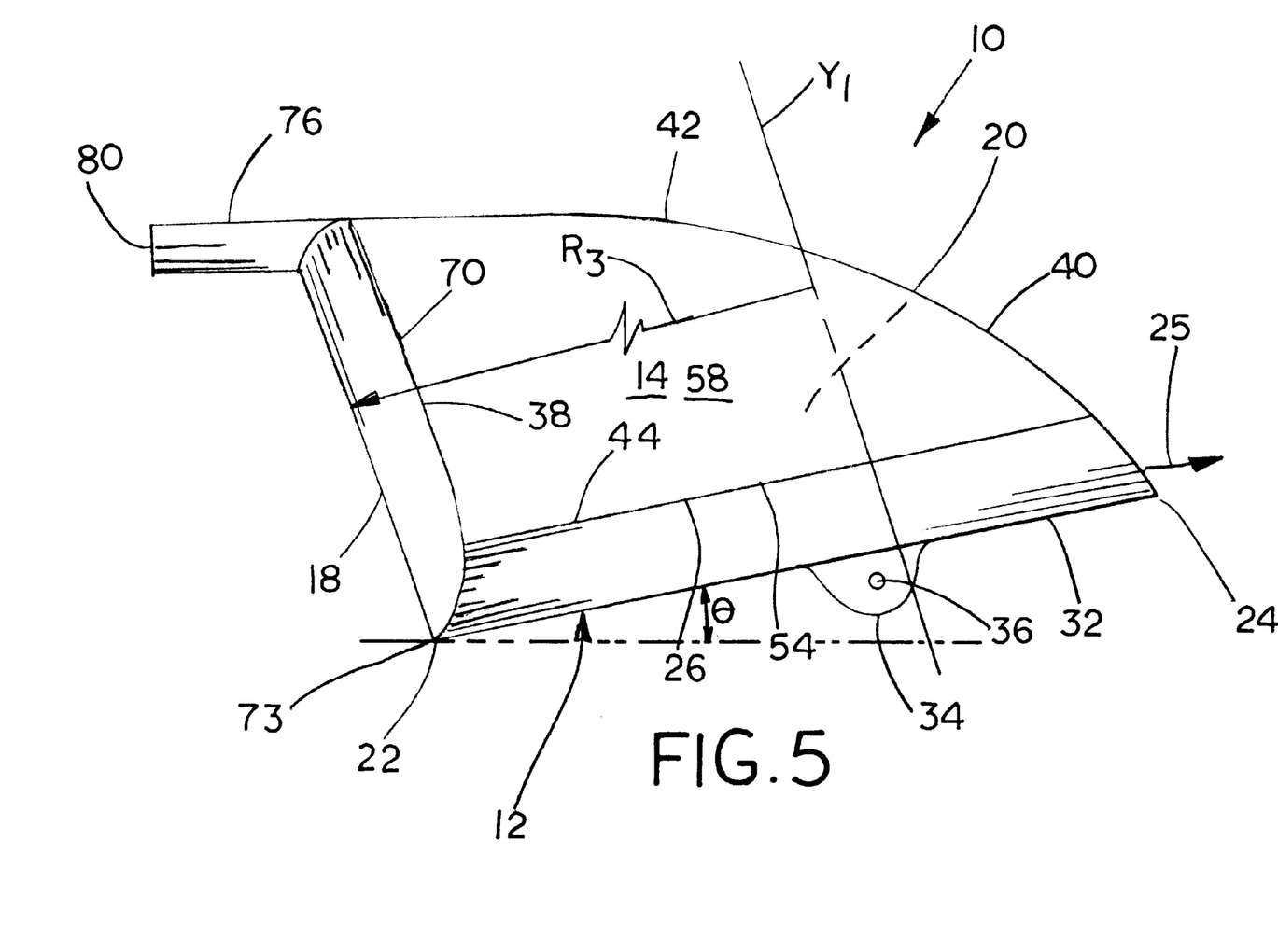
FIG. 5 is a side elevational view of the dump body of FIGS. 2 and 3.
Figure 6:
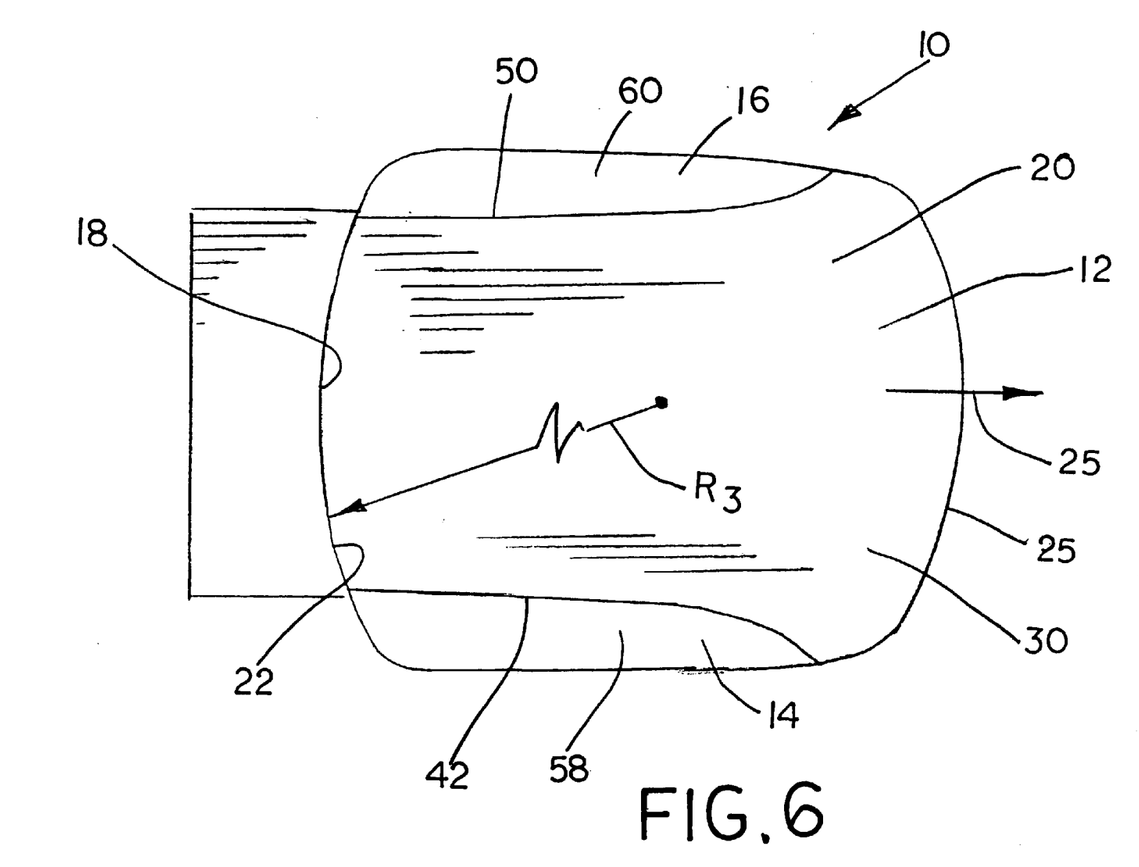
FIG. 6 is a top plan view thereof.

Referring now to FIGS. 2–6, the front wall 18 includes a pair of side edges 62, 64 and top and bottom edges 66, 68. The side edge 62 meets the forward edge 38 of the sidewall 14 along a seam 70, while the side edge 64 meets the forward edge 46 of the sidewall 16 along a seam 72. The bottom edge 68 of the front wall 18 meets the forward edge 22 of the floor 12 along a seam 73. The seams 70, 72, 73 are preferably welded. As shown in FIG. 62, the front wall 18 includes a curved section 74 disposed between the side edges 62, 64. Preferably, the curved section 74 extends all of the way, or substantially all of the way, between the side edges 62, 64, with the curved section 74 being inwardly concave with respect to the payload space 20. As shown in FIG. 5, when the dump body 10 is in the in-use position shown, the floor 12 will preferably be sloped at an angle θ which, in the disclosed example, will measure approximately twelve degrees (12°) with respect to the horizontal. Other angles may be chosen based on design considerations for the chosen application.

Figure 7:
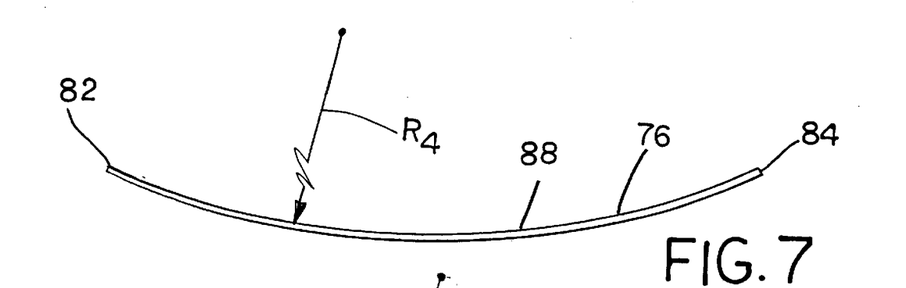
FIG. 7 is a cross-sectional view of a cab protector of the dump body of FIG. 2.

A cab protector 76 may be provided. The cab protector 76 includes a rear edge 78, a front edge 80, and a pair of side edges 82, 84. The rear edge 78 is joined to the top edge 66 of the front wall 18 along a seam 86, such that the cab protector 76 extends in a generally forward direction from the top edge 66 of the front wall 18. The seam 86 is preferably welded. As shown in FIG. 7, the cab protector 76 includes a curved section 88 extending all of the way, or substantially all of the way, between the side edges 82, 84. In the disclosed embodiment, the cab protector 76 is upwardly concave.

Referring to FIG. 4, the curved section 30 of the floor 12 has a radius of curvature of $R_1$, while the curved sections 58, 60 of the sidewalls 14, 16 have a radius of curvature of $R_2$. In the disclosed embodiment, the radius of curvature $R_1$ is greater than the radius of curvature $R_2$. More specifically, in the disclosed embodiment the curved section 30 of the floor 12 may have a radius of curvature $R_1$ of about five hundred (500) inches, while the curved sections 58, 60 of the sidewalls 14, 16 may have a radius of curvature $R_2$ of about two hundred (200) inches. Alternatively, $R_1$ and $R_2$ may be the same, or $R_1$ may be less than $R_2$. Deviations from these preferred values may be contemplated.

As is also shown in FIG. 7, the curved section 88 of the cab protector 76 will have a radius of curvature $R_4$, which in the disclosed embodiment will preferably measure about four hundred (400) inches. The above given values for $R_1$ through $R_4$ are merely exemplary. Other values for $R_1$ through $R_4$ may be chosen depending on the overall size of the dump body 10 and design payload considerations.

As is also shown in FIG. 6, the curved section 88 of the cab protector 76 will have a radius of curvature $R_4$, which in the disclosed embodiment will preferably measure about four hundred (400) inches. The above given values for $R_1$ through $R_4$ are merely exemplary. Other values for $R_1$ through $R_4$ may be chosen depending on the overall size of the dump body 10 and design payload considerations.

Figure 8:
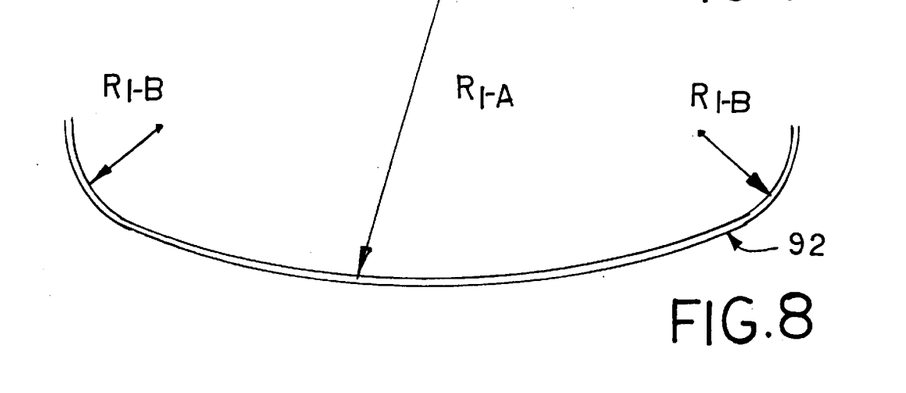
FIG. 8 is an enlarged fragmentary cross-section view of a wall panel having a complex curve.

Referring to FIG. 8, alternatively the radius of curvature $R_1$ may not be constant along the curved section 30 of the floor 12, but will instead have a complex curved section 92 in which the curved section 30 has a central portion having a radius of curvature $R_{1-A}$, and further has edge portions having a different radius of curvature $R_{1-B}$. In the example shown in FIG. 8, the central radius of curvature $R_{1-A}$ is longer than the radius of curvature $R_{1-B}$ at the outward edges. In the disclosed example, the radius of curvature $R_{1-A}$ will preferably be about five hundred (500) inches, while the radius of curvature $R_{1-B}$ will preferably have a value of about twenty (20) inches.

Figure 9:
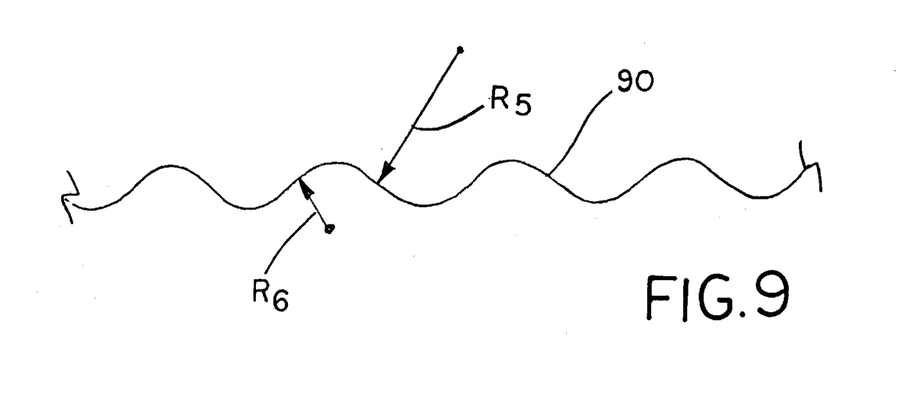
FIG. 9 is an enlarged fragmentary cross-sectional view of a curved corrugated steel section for use as a floor panel, a sidewall, and/or a front wall on the dump body of FIGS. 2 and 3.

Referring now to FIG. 9, a corrugated section 90 is shown therein, which may be used on any one of the floor 12, the sidewalls 14, 16, the front wall 18, or the cab protector 76. It will be noted that the corrugated section 90 includes portions that alternate between upwardly convex and upwardly concave when viewing FIG. 9. The alternating portions may have different radii, for example $R_5$ and $R_6$. The radii $R_5$ and $R_6$ may be the same or, as an alternative, the radii $R_5$ and $R_6$ may be different.

In operation, the dump body 10 is assembled from the floor 12, the sidewalls 14, 16, and the front wall 18, which are welded together or otherwise suitably joined along the seams 54, 56, 70, 72, 73. The cab protector 76 may be joined to the front wall 18 along the seam 86. Each of the floor 12, the sidewalls 14, 16, the front wall 18, and the cab protector 76 are preferably constructed of hardened steel plate, measuring in the disclosed embodiment abut 400 BHN (Brinnell Hardness Number) or better. The chosen material will also preferably have good notch toughness, similar to the notch toughness values commonly found on dump bodies.

In the disclosed embodiment, the floor 12 will have a thickness of about ¾ to about ½ inch, the side walls 14, 16 will have a thickness of about ⅜ to about ½ inches, the front wall 18 will have a thickness of about ⅜ to about ½ inches, and the cab protector 76 will have a thickness of about ¼ inch. Again the values given for the mentioned thicknesses are merely exemplary of the values chosen for the disclosed embodiment. The thicknesses may be varied depending on load, weight, design, and assembly considerations, all of which may be calculated by those of skill in the art using well known engineering principles.

The floor 12, the side walls 14, 16, the front wall 18, and the cab protector 76 may all be cold bent in a jig. The floor 12, the side walls 14, 16, the front wall 18, and the cab protector 76 may then all be welded together along their common seams using conventional welding and assembly techniques. Other assembly and fabrication tecniques may be employed. It will be noted in the disclosed embodiment the sidewalls 14 and 16 each slope downwardly from the respective front edges toward their respective rear edges as can be seen in each of FIGS. 2, 3 and 5. Also, in the disclosed embodiment, the floor 12 will slope upwardly toward the rear end of the dump body about 12 degrees. Again, the foregoing features are merely exemplary, and not intended to limit the scope of the appended claims.

The dump body 10 is suitably mounted to a dump truck (not shown) in a conventional manner.

Figure 10:
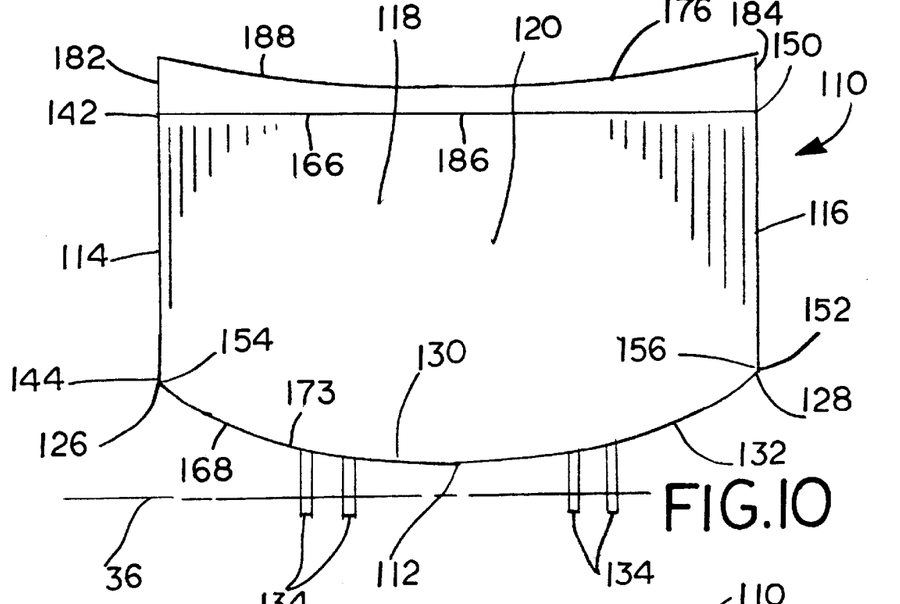
FIG. 10 is a rear elevational view similar to that shown in FIG. 4, but illustrating a dump body assembled in accordance with the teachings of a second embodiment of the present invention.
Figure 11:
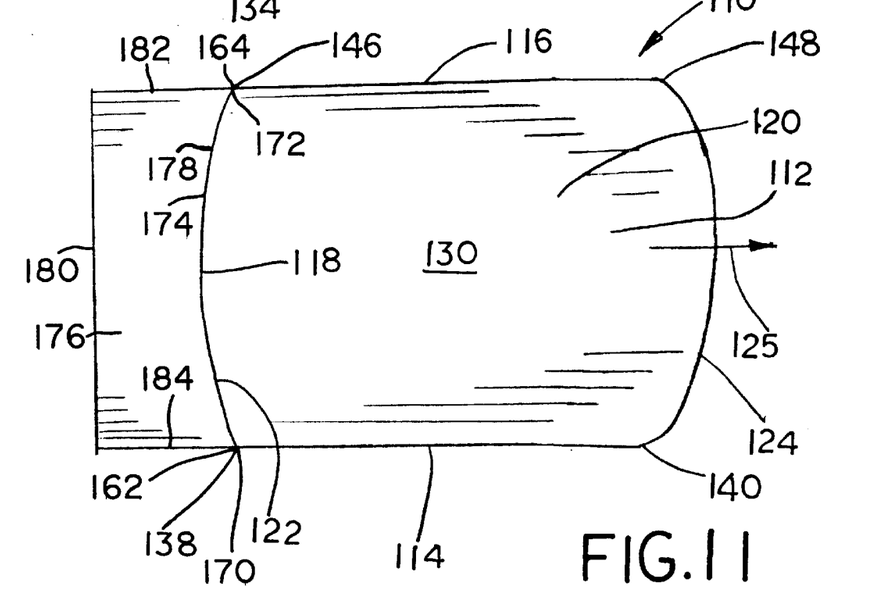
FIG. 11 is a top plan view thereof.
Figure 12:
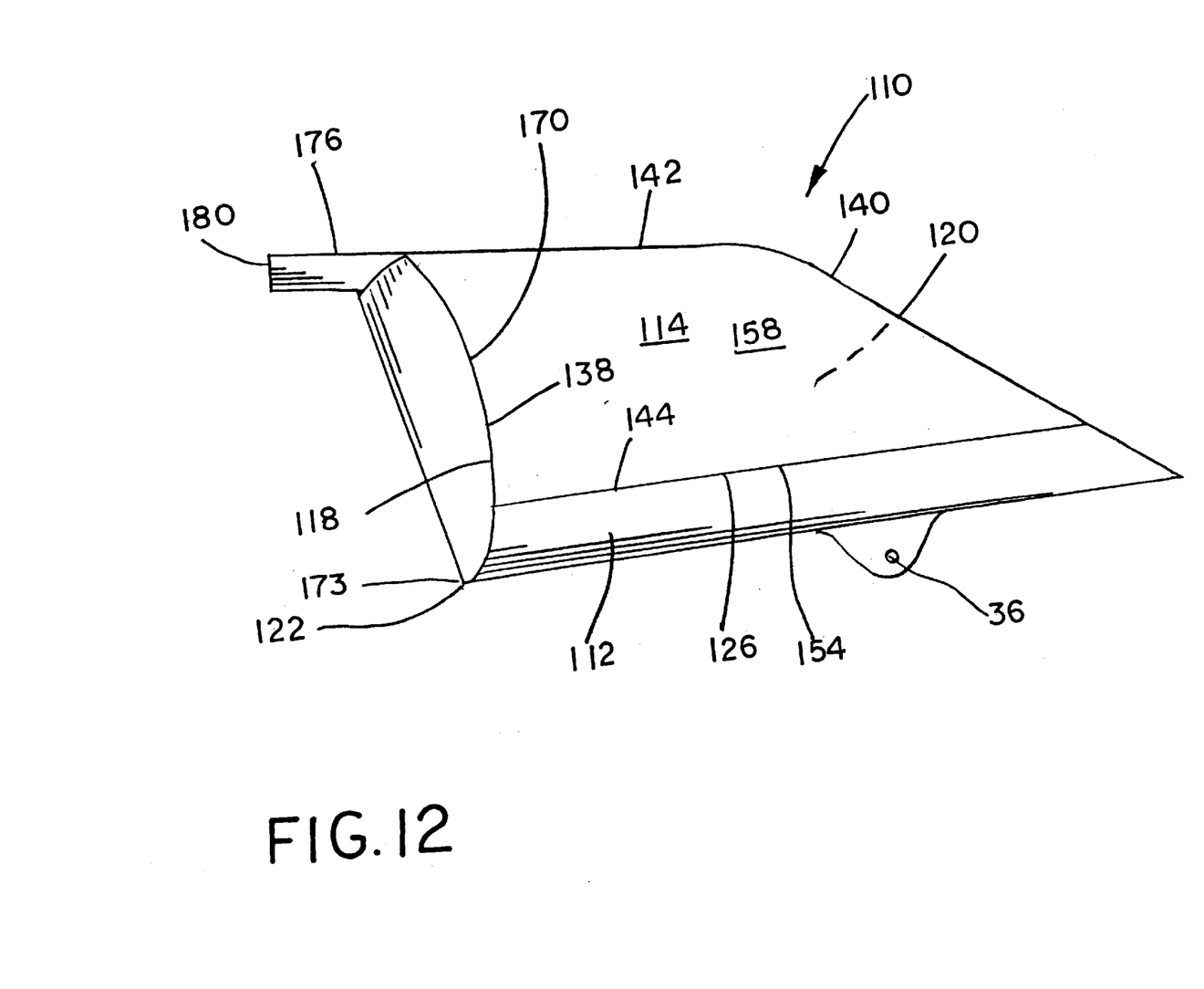
FIG. 12 is a side elevational view of a dump body similar to that shown in FIGS. 1–7 but having a front wall that is convex with respect to the payload space.

Referring now to FIGS. 10 and 11, a dump body assembled in accordance with the teachings of a second disclosed embodiment of the present invention is generally referred to by the reference numeral 110. To the extend possible, all elements that are the same or similar to the elements discussed above with respect to the first disclosed embodiment will have the same reference numerals, but increased by 100. The dump body 110 includes a floor 112, a pair of sidewalls 114, 116, and a front wall 118. The floor 112, the sidewalls, 114, 116, and the front wall 118 cooperate to generally define a payload space 120.

The floor 112 includes a forward edge 122 and a rearward edge 124, and a pair of interconnecting side edges 126, 128. The rearward edge 124, which is curved in the top plan view of FIG. 11 generally defines the rearward extent of a spillway 125. As shown in FIG. 10, the floor 112 includes a curved section 130 disposed between the side edges 126, 128. The curved section 130 may extend all the way between the side edges 126, 128, and is preferably shaped to be inwardly concave with respect to the payload space 120 (i.e., concave upwardly when viewing FIG. 10).

The floor 112 also includes a bottom surface 132 (FIG. 10). A plurality of pivot brackets 134 are provided which are secured to the bottom surface 132 of the floor 112. Again, the number, location, and construction of the pivot brackets 134 would be known to those of skill in the art, and are adapted to pivotally engage a portion of the dump truck (not shown) in a known manner.

The sidewall 114 of the dump body 112 includes a forward edge 138 (FIG. 11), a rearward edge 140 (FIG. 11), and top and bottom edges 142, 144 (FIG. 10), respectively. The sidewall 116 of the dump body 112 includes a forward edge 146 (FIG. 11), a rearward edge 148 (FIG. 11), and top and bottom edges 150, 152 (FIG. 10), respectively. As shown in FIG. 10, the lower edge 144 of the sidewall 114 meets the side edge 126 of the floor 112 along an elongated seam 154, while the lower edge 152 of the sidewall 116 meets the side edge 128 of the floor 112 along an elongated seam 156. Preferably, seams 154 and 156 are welded. In the embodiment of FIGS. 10 and 11, the sidewalls 114 and 116 are generally linear between their respective top edges (142, 150) and bottom edges (144, 152) rather than curved section.

As shown in FIG. 11, the front wall 118 includes a pair of side edges 162, 164 and top and bottom edges 166, 168 (FIG. 10). The side edge 162 meets the forward edge 138 of the sidewall 114 along a seam 170, while the side edge 164 meets the forward edge 146 of the sidewall 116 along a seam 172. As shown in FIG. 10, the bottom edge 168 of the front wall 118 meets the forward edge 122 of the floor 112 along a seam 173. The seams 170, 172, 173 are preferably welded. As shown in FIG. 11, the front wall 118 includes a curved section 174 disposed between the side edges 162, 164. Preferably, the curved section 174 extends all of the way, or substantially all of the way, between the side edges 162, 164, with the curved section 174 being inwardly concave with respect to the payload space 120.

A cab protector 176 may be provided, with the cab protector including a rear edge 178, a front edge 180, and a pair of side edges 182, 184. The rear edge 178 is joined to the top edge 166 of the front wall 118 along a seam 186 (FIG. 10), such that the cab protector 176 extends in a generally forward direction from the top edge 166 of the front wall 118. The seam 186 is preferably welded. The cab protector 176 may include a curved section 188 extending all of the way, or substantially all of the way, between the side edges 182, 184 (FIG. 10), with the cab protector 176 preferably being upwardly concave.

The radius of curvature for each of the floor 112, the front wall 118, and the cab protector 176 may be similar to the values given above for $R_1$, $R_3$, and $R_4$. Again, deviations from the disclosed exemplary values are tolerated depending on design considerations.

Those skilled in the art will appreciate that, although the teachings of the invention have been illustrated in connection with certain embodiments, there is no intent to limit the invention to such embodiments. On the contrary, the intention of this application is to cover all modifications and embodiments fairly falling within the scope of the appended claims either literally or under the doctrine of equivalents.

What is claimed:

1. A dump body for use on an off-highway rubber-tired haulage vehicle, the dump body comprising:

a curved floor, the floor having a forward portion, a rearward portion, and a pair of side edges extending between the forward portion and the rearward portion, the floor further having a bottom surface adapted for pivotal attachment to the haulage vehicle;

a pair of curved sidewalls, each of the sidewalls joined to the floor along a corresponding one of the edges of the floor, each of the sidewalls having a forward portion;

a curved front wall joined to the forward portion of the floor and to the forward portion of each of the sidewalls, whereby the floor, the sidewalls, and the front wall cooperate to define a payload space; and a cab protector joined to a top edge of the front wall and extending generally in a forward direction from the front wall, wherein the cab protector is curved.

2. The dump body of claim 1, wherein the floor includes a first radius of curvature, and wherein the sidewalls include a second radius of curvature, the first radius of curvature greater than the second radius of curvature.

3. The dump body of claim 1, wherein the floor and the sidewalls are concave with respect to the payload space.

4. The dump body of claim 3, wherein the front wall is concave with respect to the payload space.

5. The dump body of claim 1, wherein the floor is curved along more than one radius of curvature.

6. A dump body for use on an off-highway rubber-tired haulage vehicle and having a longitudinal axis, the dump body comprising:

a floor adapted for pivotal attachment to the haulage vehicle, the floor having a forward portion, a rearward portion, and a pair of side edges extending between the forward portion and the rearward portion, the floor having a curved cross-section taken transverse to the longitudinal axis;

a pair of sidewalls, each of the sidewalls joined to the floor along a corresponding one of the edges of the floor, each of the sidewalls having a curved cross-section taken transverse to the longitudinal axis, the sidewalls having a radius of curvature greater than a radius of curvature of the floor; and a front wall joined to the forward portion of the floor and to the forward portion of each of the sidewalls, the front wall curved about a generally upright axis;

the floor, the sidewalls, and the front wall cooperating to define a payload space.

7. The dump body of claim 6, wherein the floor and the sidewalls are concave with respect to the payload space.

8. The dump body of claim 7, wherein the front wall is concave with respect to the payload space.

9. The dump body of claim 6, further including a cab protector joined to a top edge of the front wall and extending generally in a forward direction from the front wall.

10. The dump body of claim 9, wherein the cab protector is curved.

11. A dump body for use on an off-highway rubber-tired haulage vehicle, the dump body comprising:

a floor, the floor having a pair of side edges extending between a forward edge and a rearward edge;

a pair of sidewalls, each of the sidewalls having a bottom edge joined to a corresponding one of the side edges of the floor, each of the sidewalls further having a top edge; and a front wall joined to the forward edge of the floor and to a forward edge of each of the sidewalls, the front wall having a bottom edge and a top edge;

the floor, the sidewalls, and the front wall cooperating to define a payload space, and wherein each of the floor, the sidewalls, and the front wall are constructed of curved plates, the curved plates being free of stiffening members.

12. The dump body of claim 11, wherein the curved portion of the floor and the curved portion of each of the sidewalls are concave with respect to the payload space.

13. The dump body of claim 12, wherein the curved portion of the front wall is convex with respect to the payload space.

14. The dump body of claim 11, including a cab protector joined to the front wall, and wherein the floor is adapted for pivotal attachment to the haulage vehicle, and further wherein each of the floor, the sidewalls and the front wall are formed of thin wall steel panels.

15. The dump body of claim 11, wherein the curved portion of at least one of the floor, the sidewalls, or the front wall comprises a corrugated section.

16. A dump body for use on an off-highway rubber-tired haulage vehicle, the dump body comprising:
a curved floor, the floor having a forward portion, a rearward portion, and a pair of side edges extending between the forward portion and the rearward portion, the floor further having a bottom surface adapted for pivotal attachment to the haulage vehicle;
a pair of sidewalls, each of the sidewalls joined to the floor along a corresponding one of the edges of the floor, each of the sidewalls having a forward portion;
a curved front wall joined to the forward portion of the floor and to the forward portion of each of the sidewalls; and
a cab protector joined to a top edge of the front wall and extending generally in a forward direction from the front wall,
whereby the floor, the sidewalls, and the front wall cooperate to define a payload space.

17. The dump body of claim 16, wherein the floor includes a radius of curvature of about 500 inches.

18. The dump body of claim 16, wherein the floor and the front wall are concave with respect to the payload space.

19. The dump body of claim 16, wherein the floor is curved along more than one radius of curvature.

20. The dump body of claim 16, wherein the floor includes a corrugated cross-section.

21. A dump body for use on an off-highway rubber-tired haulage vehicle and having a longitudinal axis, the dump body comprising:
a floor adapted for pivotal attachment to the haulage vehicle, the floor having a portion, a rearward portion, and a pair of side edges extending between the forward portion and the rearward portion, the floor having a curved cross-section taken transverse to the longitudinal axis;
a pair of sidewalls, each of the sidewalls joined to the floor along a corresponding one of the edges of the floor;
a front wall joined to the forward portion of the floor and to the forward portion of each of the sidewalls, the front wall having a curved cross-section taken transverse to a vertical axis; and
a curved cab protector joined to a top edge of the front wall and extending generally in a forward direction from the front wall,
the floor, the sidewalls, and the front wall cooperating to define a payload space.

22. The dump body of claim 21, wherein the floor and the front wall are concave with respect to the payload space.

23. The dump body of claim 22, wherein the front wall is convex with respect to the payload space.

24. A dump body for use on an off-highway rubber-tired haulage vehicle, the dump body comprising:
a curved floor, the floor having a first radius of curvature, a forward portion, a rearward portion, and a pair of side edges extending between the forward portion and the rearward portion, the floor further having a bottom surface adapted for pivotal attachment to the haulage vehicle;
a pair of curved sidewalls, each of the sidewalls joined to the floor along a corresponding one of the edges of the floor, each of the sidewalls include a forward portion and a second radius of curvature, the first radius of curvature greater than the second radius of curvature; and
a curved front wall joined to the forward portion of the floor and to the forward portion of each of the sidewalls;
whereby the floor, the sidewalls, and the front wall cooperate to define a payload space.

25. The dump body of claim 24, further including a cab protector joined to a top edge of the front wall and extending generally in a forward direction from the front wall.

26. The dump body of claim 25, wherein the cab protector is curved.

27. The dump body of claim 24, wherein the floor and the sidewalls are concave with respect to the payload space.

28. The dump body of claim 27, wherein the front wall is concave with respect to the payload space.

29. The dump body of claim 24, wherein the floor is curved along more than one radius of curvature.

30. A dump body for use on an off-highway rubber-tired haulage vehicle and having a longitudinal axis, the dump body comprising:
a floor adapted for pivotal attachment to the haulage vehicle, the floor having a forward portion, a rearward portion, and a pair of side edges extending between the forward portion and the rearward portion, the floor having a curved cross-section taken transverse to the longitudinal axis;
a pair of sidewalls, each of the sidewalls joined to the floor along a corresponding one of the edges of the floor, each of the sidewalls having a curved cross-section taken transverse to the longitudinal axis;
a front wall joined to the forward portion of the floor and to the forward portion of each of the sidewalls, the front wall curved about a generally upright axis;
a curved cab protector joined to a top edge of the front wall and extending generally in a forward direction from the front wall; and
the floor, the sidewalls, and the front wall cooperating to define a payload space.

31. The dump body of claim 30, wherein the floor and the sidewalls are concave with respect to the payload space.

32. The dump body of claim 31, wherein the front wall is concave with to the payload space.

33. The dump body of claim 31, wherein the floor has a radius of curvature different than a radius of curvature of the sidewalls.

34. The dump body of claim 33, wherein the radius of curvature of the floor is greater than the radius of curvature of the sidewalls.

* * * * *